W. G. FISHER.
TRACTOR WHEEL.
APPLICATION FILED APR. 7, 1919. RENEWED DEC. 3, 1920.

1,365,973.  Patented Jan. 18, 1921.

INVENTOR
WALTER G. FISHER
by
ATTYS

UNITED STATES PATENT OFFICE.

WALTER GEORGE FISHER, OF ORANGEVILLE, ONTARIO, CANADA.

TRACTOR-WHEEL.

1,365,973.  Specification of Letters Patent.  Patented Jan. 18, 1921.

Application filed April 7, 1919, Serial No. 288,154.  Renewed December 3, 1920.  Serial No. 428,150.

*To all whom it may concern:*

Be it known that I, WALTER GEORGE FISHER, of the town of Orangeville, in the county of Dufferin, in the Province of Ontario, Canada, have invented certain new and useful Improvements in Tractor-Wheels, of which the following is the specification.

My invention relates to improvements in tractor wheels of the type in which a series of plates are arranged around the periphery of the wheel and so connected thereto as to be brought successively into longitudinal alinement as the wheel travels thereover and to be lifted after the travel of the wheel and the object of the invention is to provide a yieldable connection between the plates and the wheel periphery whereby an even travel of the wheel on to the plates is insured and yet at the same time will hold the plates rigidly as the wheel travels thereonto and it consists essentially of the following arrangement and construction of parts as hereinafter more particularly explained.

In the drawings like characters of reference indicate corresponding parts in the various figures.

Figure 3:
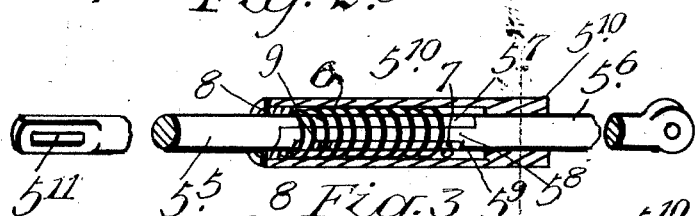
Fig. 3, is an enlarged detail of the resilient yieldable connection between the plates and the wheel periphery.
Figure 4:
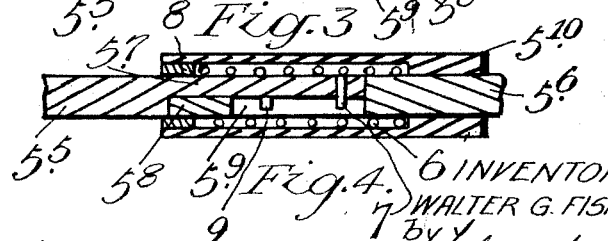
Fig. 4, is a longitudinal sectional view through the parts shown in Fig. 3.

1 indicates a wheel. 2 indicate bearing brackets secured to the wheel rim around its inner periphery and spaced at suitable distances apart. 3 indicate cross rods held in the bracket 2. 4 indicate bracket plates provided with upturned flange portions $4^x$ adapted to extend to each side of the wheel rim and bearing lugs $4^o$, $4'$, $4^2$ and $4^3$ located at each corner of the plate. 5 indicates a link pivotally mounted at one end between the lug $4^o$ and the adjacent flange $4^x$ of the plate. The opposite end of the link 5 is mounted on the projecting end of the cross rod 3 located at the opposite end of the plate. $5'$ indicates a similar link pivotally connected at one end between the lug $4'$ and the adjacent flange $4^x$ of the plate and mounted at its opposite end upon the protruding opposite end of the cross bar 3. $5^2$ indicates a link pivotally mounted between the lug $4^3$ and the adjacent flange $4^x$ and mounted at its opposite end upon the protruding end of the cross bar 3 located at the opposite end of the plate to the lug $4^3$. $5^3$ indicates a link pivotally mounted at one end between the lug $4^2$ and the adjacent flange $4^x$ of the plate and mounted at the opposite end upon the cross bar 3 located at the opposite end of the plate to the lugs $4^2$ and $4^3$. Each of the links 5, $5'$, $5^2$ and $5^3$ are formed as indicated in Figs. 3 and 4, each link being divided into two portions $5^5$ and $5^6$, the inner ends of these portions being formed by extensions $5^7$ and $5^8$, the extensions $5^7$ and $5^8$ each forming half of the bar and overlapping one over the other as indicated in Figs. 3 and 4. The overlapping portion $5^8$ is provided with a longitudinal slot $5^9$.

$5^{10}$ indicates a covering sleeve secured to the link member $5^6$. The sleeve $5^{10}$ extends over the divided portions $5^7$ and $5^8$ and is spaced apart therefrom so as to form a receiving space for a spiral spring 6.

7 indicates a pin which is secured in the portion $5^7$ of the link portion $5^5$ and extends at one end through the slot $5^9$ and against the protruding ends of which one end of the spring 6 bears. 8 indicates an annular closure for the opposite end of the sleeve which is suitably secured therein and against which the opposite end of the spring bears. 9 indicates a pin extending from the portion $5^7$ into the slot $5^9$ in proximity to the opposite end of the slot to the pin 7.

It will thus be seen that the link when pulled longitudinally is free to expand to a limited extent against the compression of the spring 6, such movement being limited by the pin 9. Any tendency for the members $5^6$ and $5^7$ of the links to move in the opposite direction is prevented by the overlapping portions $5^7$ and $5^8$ shouldering one against the other. The outer end of each link is also provided with a longitudinal slot $5^{11}$ through which the pivot pin connecting it to the plate 4 passes thereby allowing for a slight longitudinal movement of the link for a purpose which will hereinafter appear.

Figure 1:
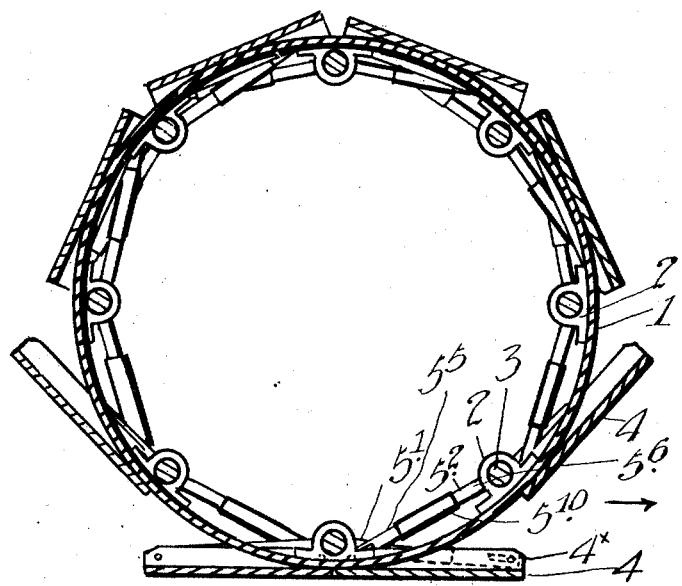
Figure 1, is a sectional view of a wheel showing the tractor plates in position, two of the tractor plates being in an alined position on the ground, the wheel traveling from one on to the other.
Figure 2:
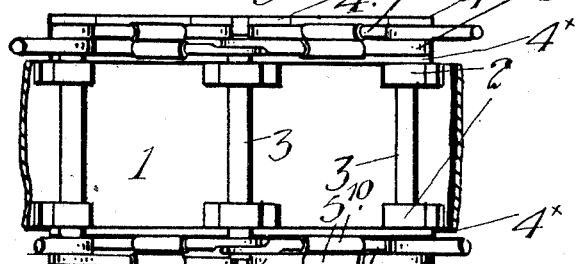
Fig. 2, is a plan view of the two alined plates and their connection to a portion of the wheel periphery.

As the wheel travels forward in the direction of arrow as indicated in Fig. 1 the links $5^2$ and $5^3$ tend to expand as the distance between the pivotal connection between the link and the plate 4 and the center of swing of the link formed by the cross bar 3 increases as the wheel rolls on to the next longitudinally alined plate. The links 5 and 5' connected to the opposite end of the plate and to the cross rod 3 located at the opposite end of the plate to the aforementioned cross bar 3 are swung upwardly during the travel of the wheel, the swing of the links being practically concentric to its pivotal connection to the end of the plate, any slight variation of this movement being taken up by the longitudinal slot $5^{11}$. When this slight movement is taken up the link remains a rigid link, the link portions $5^5$ and $5^6$ shouldering one against the other thereby holding the plates firmly during the travel of the wheel thereonto.

From this description it will be seen that I have devised a very simple form of connection between the tread plates and the wheel rim whereby an even travel of the wheel on to the plates is provided for and in which all strain of the parts during such travel is prevented and yet at the same time by which the plates are firmly held in position during such travel.

What I claim as my invention is.

1. The combination with the wheel rim, cross bars carried by the wheel rim and tread plates, of links longitudinally expandible under tension connecting the ends of the tread plates to the cross bars carried by the wheel rim at the opposite end of the plate.

2. The combination with the wheel rim, cross bars carried by the wheel rim and tread plates, of links adapted to expand longitudinally to increase their length in one direction and to be held rigidly from contraction in the opposite direction for connecting the ends of the tread plates to the cross bars carried by the wheel rim at the opposite end of the plate.

3. In a traction wheel, the combination with the wheel rim, tread plates and cross bars carried by the wheel rim intermediately of each pair of plates, of criss cross links connecting the ends of the plates to the cross bars of the wheel rim, each of such links being divided into two portions having overlapping parallel portions held from inward movement and, capable of drawing outward, and resilient means against which the link portions rest when drawn longitudinally outward.

4. In a traction wheel, the combination with the wheel rim, tread plates and cross bars carried by the wheel rim intermediately of each pair of plates, of criss cross links connecting the ends of the plates to the cross bars of the wheel rim, each of such links being divided into two portions provided with overlapping semi-bar extensions fitting one within the other, one of such extensions having a longitudinal slot, an abutment carried in proximity to the outer end of each of such extensions, and a compression spring surrounding the links between such abutments.

WALTER GEORGE FISHER.

Witnesses:
M. EGAN,
K. D. POGEON.